United States Patent [19]

Onodera

[11] Patent Number: 5,684,974
[45] Date of Patent: Nov. 4, 1997

[54] METHOD AND APPARATUS FOR CONTROLLING RECONFIGURATION OF STORAGE-DEVICE MEMORY AREAS

[75] Inventor: Osamu Onodera, Handano, Japan

[73] Assignee: Hitachi, Ltd., Tokyo, Japan

[21] Appl. No.: 402,371

[22] Filed: Mar. 13, 1995

[30] Foreign Application Priority Data

Mar. 17, 1994 [JP] Japan .................................. 6-072536

[51] Int. Cl.$^6$ ............................ G06F 12/00; G06F 12/02; G06F 9/26; G06F 9/32
[52] U.S. Cl. ..................... 395/412; 395/415; 395/416; 395/419; 395/406; 395/427; 395/421.1
[58] Field of Search ....................... 340/172.5; 395/405, 395/412, 406, 416, 419, 415, 421.1, 417, 477.01

[56] References Cited

U.S. PATENT DOCUMENTS

| | | | |
|---|---|---|---|
| 3,723,976 | 3/1973 | Alvarez et al. | 340/172.5 |
| 4,075,694 | 2/1978 | Ericsson | 395/412 |
| 4,685,057 | 8/1987 | Lemone et al. | 395/421.1 |
| 4,761,737 | 8/1988 | Duvall et al. | 395/419 |

FOREIGN PATENT DOCUMENTS

| | | | |
|---|---|---|---|
| 03101275 | 2/1989 | European Pat. Off. | G06F 9/46 |
| 2-33639 | 2/1990 | Japan | 12/2 |
| 2256513 | 12/1992 | United Kingdom | G06F 12/02 |

*Primary Examiner*—David K. Moore
*Assistant Examiner*—Than V. Nguyen
*Attorney, Agent, or Firm*—Antonelli, Terry, Stout & Kraus, LLP.

[57] ABSTRACT

An apparatus and method for controlling the reconfiguration of the physical storage area in a real storage device employed by an information processing system.

The invention includes an address reconfiguration array having a plurality of storage blocks which are each assigned to a virtual computer. Each storage block is composed of a plurality of host real-address entries. Assigned to a storage area in the logical memory of a virtual computer, each host real-address entry includes a validity field containing a validity bit and a host real-address field containing a high-order part of the start address of a real storage segment allocated to the storage area. The invention also includes a selector which receives the identifier of a virtual computer and a logical address from the virtual computer, and makes use of the identifier for choosing a storage block from the address reconfiguration array and a high-order portion of the logical address for selecting a host real-address entry from the chosen storage block. The value of the host real-address field of the selected host real-address entry, the high-order part of a real address, is then read out from the selected host real-address entry, and is merged with the low-order portion of the logical address in order to create a real address. If the validity bit indicates that the contents of the host real-address entry are invalid, however, the virtual computer is interrupted. A change to the contents of the address reconfiguration array can be made by replacing the contents of a host real-address entry chosen by the selector with update data.

8 Claims, 6 Drawing Sheets

METHOD AND APPARATUS FOR CONTROLLING RECONFIGURATION OF STORAGE-DEVICE MEMORY AREAS

BACKGROUND OF THE INVENTION

The present invention relates to conversion of logical storage-device memory addresses in virtual computers into real storage-device memory addresses in a physical computer employed in a virtual-computer system. In particular, the present invention relates to a technique for controlling the reconfiguration of storage-device memory areas in a process of allocating storage segments of a real storage device employed in a physical computer to logical storage areas in a plurality of virtual computers each having a logical storage device including such logical storage areas.

In general, a concept known as a virtual computer is embraced as a technique for running a plurality of operating systems on a single information processing apparatus. The virtual computer and operating system (OS) are also referred to hereafter as a logical partition (LPAR) and an OS respectively.

In order to implement LPARs on a single physical information processing apparatus, software called a VMCP (Virtual Machine Control Program) is executed on the information processing apparatus. A plurality of LPARs are created under the control of the VMCP. Furthermore, an independent OS is operated in each of the LPARs.

Thus, the VMCP has a function that allows a plurality of LPARs to share the single physical information processing apparatus which serves as a hardware resource in the virtual-computer system.

Methods for sharing the hardware resource provided by the single information processing apparatus among the LPARs include a technique of allocating the hardware resource on a time-sharing basis under the control of the VMCP, a technique of logically dividing the hardware resource into entities and allocating each entity exclusively to an LPAR, and a method of mixing the two above described techniques.

Figure 1:
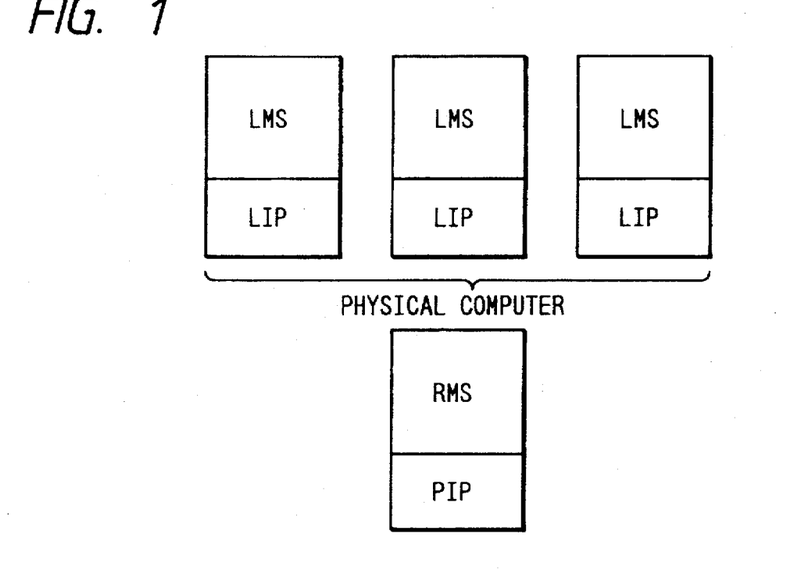
FIG. 1 is a conceptual diagram showing a configuration of sharing a physical processor among a plurality of virtual computers in accordance with the conventional technology.

Next, the prior art is explained by referring to FIG. 1.

An example of a virtual-machine system is shown in FIG. 1. As shown in the figure, the virtual-machine system comprises three units of LPARs created in a single physical computer. The virtual-machine system is configured so that the three LPARs can operate independently of each other.

As shown in the figure, the physical computer comprises a real central processing unit and a real storage device which are also referred to hereafter as a PIP (Physical Instruction Processor) and an RMS (Real Main Storage) respectively. In the example, three LPAR systems are constructed to run on the single physical computer. The LPAR systems each comprise a logical central processing unit and a logical storage unit (logical memory) which are also referred to hereafter as an LIP (Logical Instruction Processor) and an LMS (Logical Main Storage) respectively. A VMCP runs on the PIP. The three LPAR systems operate independently of each other under the control of the VMCP. Processing functions of a LIP pertaining to an LPAR are implemented by allocating the hardware resource of the PIP on a time-sharing basis under the control of the VMCP. On the other hand, storage functions of a LMS pertaining to an LPAR are implemented by logically dividing the storage area of the RMS also under the control of the VMCP into storage segments and allocating each storage segment exclusively to an LPAR, or logically dividing a virtual storage area created on the RMS into portions and allocating each portion exclusively to an LPAR.

Figure 2:
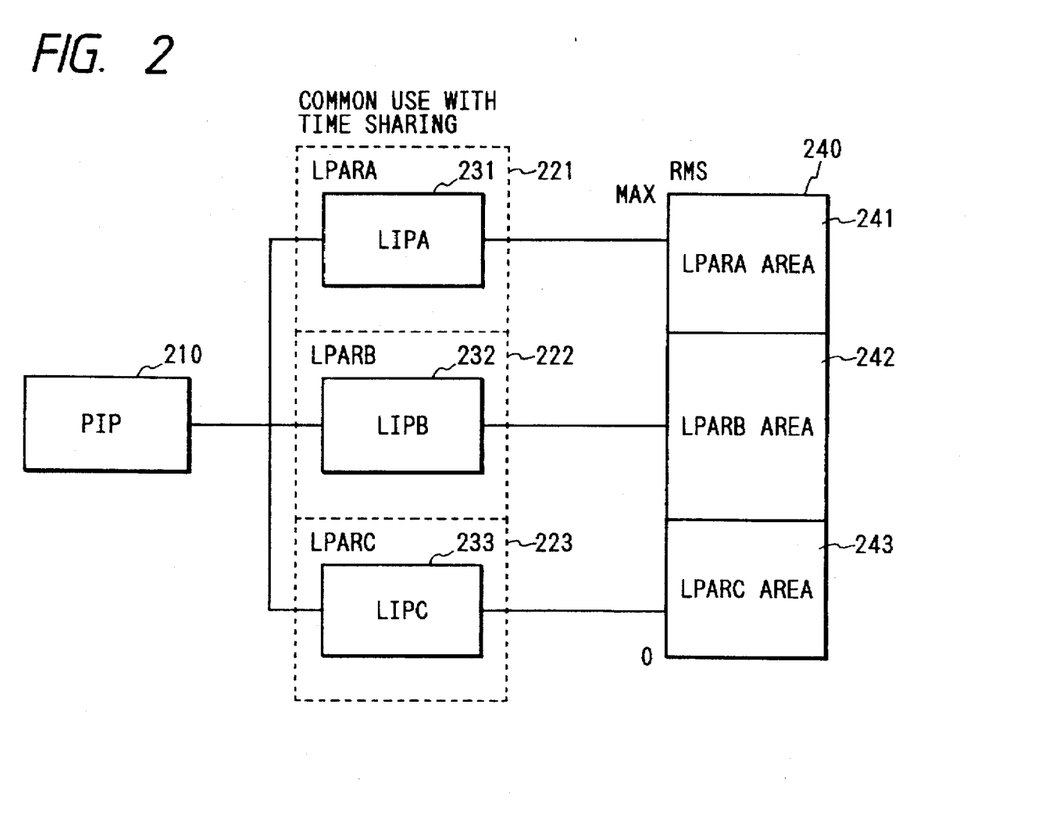
FIG. 2 is a conceptual diagram showing a configuration of a plurality of virtual computers operating on a single physical processor and a plurality of storage segments of a real storage device allocated to the virtual computers in accordance with the conventional technology.

Relations among the PIP, LPARs, LIPs, LMSes and RMS are shown in FIG. 2.

The VMCP running on the PIP denoted by reference numeral 210 in the figure controls the allocation of the PIP 210, a hardware resource, to virtual computers LPARA, LPARB and LPARC denoted by reference numerals 221, 222 and 223 respectively. In addition to LMSes which are not shown in the figure, the LPARA 221, LPARB 222 and LPARC 223 include logical central processing units LIPA, LIPB and LIPC respectively which are denoted by reference numerals 231, 232 and 233 respectively.

The LIPA, LIPB and LIPC 231, 232 and 233 operate independently of each other and also independently access the RMS which is denoted by reference numeral 240.

The RMS 240 is logically divided into three storage segments which are associated with the LPARA, LPARB and LPARC 221, 222 and 223 respectively. The three storage segments are LPARA, LPARB and LPARC areas denoted by reference numerals 241, 242 and 243 respectively.

When the RMS 240 is divided into the three storage segments, the VMCP provides the LPARs with information on start addresses and storage sizes of the three storage segments allocated to the LPARs. In the virtual-machine system shown in FIG. 2, the LIPA 231 can access only the LPARA area 241 while the LIPB 232 can access only the LPARB area 242. Likewise, the LIPC 233 can access only the LPARC area 243.

An LPAR actually accesses an LPAR area allocated thereto when any piece of software is executed on the LPAR after the LPAR is activated by the operator. It should be noted that activating a virtual computer is equivalent to powering up a physical computer.

The VMCP, which runs on the PIP, controlling the operations of the LPARs, can access all storage segments of the RMS 240.

Figure 3A:
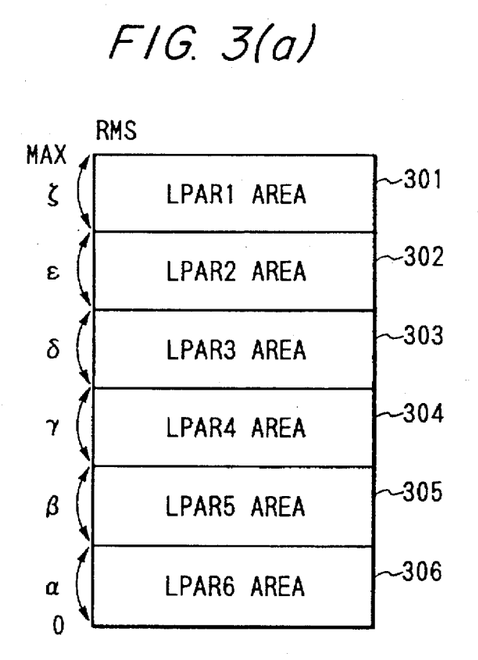
FIG. 3(a) is a diagram showing allocation of storage segments of a real storage device to a plurality of virtual computers.
Figure 3B:
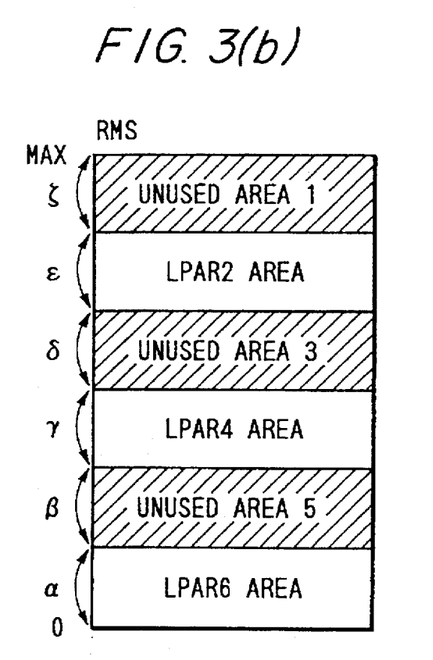
FIG. 3(b) is a diagram showing allocation of storage segments of a real storage device to a plurality of virtual computers, wherein some of the virtual computers are not using storage segments allocated to them, in accordance with the conventional technology.

Next, an example of logically dividing the RMS into storage segments to be allocated to a plurality of LPARs is explained by referring to FIGS. 3(a) and 3(b).

An example of logically dividing the RMS into six storage segments and allocating each storage segment to an LPAR is shown in FIG. 3(a). In this example, there are six LPARs: LPAR1, LPAR2, LPAR3, LPAR4, LPAR5 and LPAR6 to which an LPAR1 area 301, an LPAR2 area 302, an LPAR3 area 303, an LPAR4 area 304, an LPAR5 area 305 and an LPAR6 area 306 are allocated respectively. As described earlier, an LPAR area is actually accessed by the associated LPAR after the LPAR is activated.

The storage-area origin and storage size of the LPAR6 area 306 have values of 0 and $\alpha$ respectively. The storage-area origin and storage size are referred to hereafter as a STRORG (storage origin) and STREXT (storage extension) respectively. In other words, the LPAR6 area 306 is a storage segment in the RMS which starts at storage address 0 and ends at storage address $\alpha-1$.

The STRORG and STREXT values of the LPAR5 area 305 are $\alpha$ and $\beta$ respectively. In other words, the LPAR5 area 305 is a storage segment in the RMS which starts αat storage address $\alpha$ and ends at storage address $\alpha+\beta-1$.

Similarly, the STRORG values of the LPAR4 area 304, the LPAR3 area 303, the LPAR2 area 302 and the LPAR1 area 301 are $\alpha+\beta$, $\alpha+\beta+\gamma$, $\alpha+\beta+\gamma+\delta$ and $\alpha+\beta+\gamma+\delta+\epsilon$ respectively. On the other hand, STREXT values of the LPAR4 area 304, the LPAR3 area 303, the LPAR2 area 302 and the LPAR1 area 301 are $\gamma$, $\delta$, $\epsilon$ and $\zeta$ respectively.

FIG. 3(b) shows a case in which some of the six LPARs assigned to storage segments of the RMS shown in FIG. 3(a) have been activated.

Strictly speaking, all the six LPARs were once activated. Later on, the LPAR1, LPAR3 and LPAR5 were deactivated, leaving the LPAR2, LPAR4 and LPAR6 in an activated state as they are. FIG. 3(b) is a diagram showing the state of allocation of storage segments in the RMS with the LPAR2, LPAR4 and LPAR6 remaining in an activated state.

As described above, FIG. 3(b) shows the LPAR2, LPAR4 and LPAR6 in an activated state, using the LPAR2 area 302, LPAR4 area 304 and LPAR6 area 306 of the RMS which have been allocated to them respectively.

Since the LPAR6 is activated, it is using the LPAR6 area 306 with STRORG and STREXT values of 0 and $\alpha$ respectively. As described above, the LPAR6 area 306 is a storage segment in the RMS which starts at address 0 and ends at address $\alpha-1$.

Since the LPAR5 is deactivated, on the other hand, the storage segment in the RMS starting at address $\alpha$ and ending at address $\alpha+\beta-1$ is not used.

Likewise, since the LPAR4 is activated, it is using the LPAR4 area 304 with STRORG and STREXT values of $\alpha+\beta$ and $\gamma$ respectively. As described above, the LPAR4 area 304 is a storage segment in the RMS which starts at address $\alpha+\beta$ and ends at address $\alpha+\beta+\gamma-1$. Similarly, since the LPAR2 is activated, it is using the LPAR2 area 302 with STRORG and STREXT values of $\alpha+\beta+\gamma+\delta$ and $\epsilon$ respectively. As described above, the LPAR2 area 302 is a storage segment in the RMS which starts at address $\alpha+\beta+\gamma+\delta$ and ends at address $\alpha+\beta+\gamma+\delta+\epsilon-1$.

Much like the LPAR5, since the LPAR3 is deactivated, the storage segment in the RMS starting at address $\alpha+\beta+\gamma$ and ending at address $\alpha+\beta+\gamma+\delta-1$ is not used. Likewise, since the LPAR1 is deactivated, the storage segment in the RMS starting at address $\alpha+\beta+\gamma+\delta+\epsilon$ and ending at address $\alpha+\beta+\gamma+\delta+\epsilon+\zeta-1$ is not used. Accordingly, the sizes of the unused storage segments in the RMS in this case are $\beta$, $\delta$ and $\zeta$.

Here, an attempt is made, for example, to activate an LPAR7 requiring a storage capacity of $\eta$. In this case, $\eta$ is compared to the sizes of the unused storage segments: $\beta$, $\delta$ and $\zeta$. The LPAR7 can be activated only if $\eta$ is found smaller than or equal to the largest among $\beta$, $\delta$ and $\zeta$. If $\eta$ is greater than $\beta$, $\delta$ and $\zeta$, on the other hand, the LPAR7 cannot be activated.

The LPAR7 cannot be activated even if the total amount of two or three of $\beta$, $\delta$ and $\gamma$ is equal to or greater than $\eta$. This is because $\beta$, $\delta$ and $\gamma$ are the sizes of noncontiguous storage segments. Since a contiguous unused storage segment having a size equal to or greater than $\eta$ does not exist in the RMS, the LPAR7 cannot be activated.

As described above, with the conventional technique of the prior art to logically divide the RMS into storage segments and allocate these storage segments to LPARs, a new LPAR requiring a storage capacity greater than the size of the largest contiguous unused storage segment available in the RMS cannot be activated even if the total size of all unused storage segments existing in the RMS is greater than the storage capacity. Accordingly, the unused storage segments in the RMS with a total size exceeding the storage capacity required the LPAR to be activated cannot be used, because they are not contiguous. The conventional technique has a problem that it may be impossible to activate a new LPAR only because a contiguous unused storage segment having a size equal to or greater than the storage capacity required by the new LPAR does not exist in the RMS even if the total size of all unused storage segments available in the RMS is greater than the required storage capacity. From the system-operational point of view, this problem cannot be ignored.

A conventional technology adopted to solve the problem described above is disclosed in Japanese Patent Laid-open No. 2-33639 with a title 'Main-Memory Management of a Virtual Machine System.'

A memory-management system according to the conventional technology described in 2-33639 includes:

start-address registers for storing start addresses of all storage segments in the real main storage device of a physical computer allocated to logical storage areas of the logical memory of each activated LPAR;

boundary-address registers for storing boundary addresses of logical storage areas of the logical memory employed in each activated LPAR;

a comparator for determining one of the logical storage areas in a logical memory which a logical address in the logical memory pertains to; and an adder for converting the logical address into a real address in the real main storage device by adding the logical address to a value determined by the contents of a start-address register assigned to a storage segment in the real main storage device allocated to the logical storage area determined by the comparator.

Accordingly, a plurality of noncontiguous storage segments of the real main storage device can be allocated to storage areas of the logical memory of an LPAR as if the storage segments were a contiguous resident area, making it possible to reserve storage segments with any arbitrary sizes, which satisfy the capacity of the logical memory employed in an LPAR, in the real main storage device at a high speed. As a result, a logical address in the logical memory of an LPAR can thus be converted into a real address in the real main storage device of the physical computer at a high speed with a real start address stored in a start-address register used as a base. On top of that, the conventional technique allows a virtual-machine system to be implemented, wherein the real main storage device can be allocated to a plurality of LPARs effectively without interrupting operations of already activated LPARs.

With the technique of the conventional technology described in 2-33639 to logically divide the RMS into storage segments and allocate the storage segments to a plurality of LPARs, however, at least as many start-address registers and as many boundary-address registers as storage segments having noncontiguous addresses in the RMS are required. As the number of such storage segments increases, a large number of registers, adders and comparators are also required as well.

If signal lines connecting these registers, adders and comparators to each other are implemented by hardware logic, much hardware logic also needs to be added, entailing an extremely high cost of the information processing apparatus which gives rise to an industrial problem in the process of manufacturing of industrial products. This industrial problem is so serious that it cannot be ignored by all means.

SUMMARY OF THE INVENTION

It is an object of the present invention to provide a real storage device that keeps the manufacturing cost low, enhances the operatability of the system and, at the same time, allows the real storage device to be utilized efficiently through the implementation of area reconfiguration of the real storage device for preventing the numbers of required registers, adders and comparators from rising substantially due to a larger number of noncontiguous segments becoming available among a plurality of storage segments in the real storage device.

In order to achieve the object described above, the present invention provides a method for controlling reconfiguration of the physical storage area of a real storage device employed in an information processing apparatus employing a central processing unit in addition to the real storage device. The physical storage area is logically divided into a plurality of storage segments to be allocated to a plurality of logical memories which are each employed in one of a plurality of virtual computers all operating on the central processing unit.

Utilized in the method is an address reconfiguration array which includes a plurality of storage blocks each assigned to one of the virtual computers. As described above, the virtual computers each have a logical memory. The logical memory is divided into a plurality of logical storage areas by a high-order portion of logical addresses in the logical memory. Each of the storage blocks is composed of a plurality of host real-address entries which are each assigned to one of the logical storage areas and used for storing a high-order part of the start address of a storage segment. Also used in this method in addition to the address reconfiguration array are selecting apparatus for selecting one of the storage blocks from the address reconfiguration array in accordance with a virtual computer's identifier issued by the virtual computer and selecting one of the host real-address entries from the selected storage block in accordance with the high-order portion of a logical address specified also by the same virtual computer. When a virtual computer makes a request for conversion of a logical address in the logical memory of the virtual computer into a real address in the real storage device by issuing the identifier of the logical computer and the logical address to the selecting apparatus, the identifier is used by the selecting apparatus for choosing one of the storage blocks from the address reconfiguration array whereas the high-order portion of the logical address is used by the selecting means for selecting one of the host real-address entries from the selected storage block. The high-order part of the start address of a storage segment read out from the selected host real-address entry is then merged with the remaining low-order portion of the logical address to create the real address in the storage segment of the real storage device. When a virtual computer makes a request to change the contents of a host real-address entry in the address reconfiguration array, the virtual computer issues its identifier and a logical address in its logical memory to the selecting apparatus as well as the high-order part of the start address of a storage segment to the address reconfiguration array. The identifier is used by the selecting apparatus for choosing one of the storage blocks from the address reconfiguration array while the high-order portion of the logical address is used by the selecting apparatus for selecting one of the host real-address entries from the selected storage block. The high-order part of the start address of the storage segment is then written into the selected host real-address entry, replacing teh previous contents of the selected host real-address entry.

In addition, each of the host real-address entries comprises a validity field for storing a flag indicating whether or not the contents of the host real-address entry are valid, and a host real-address field for storing the high-order part of the start address a storage segment. When the contents of a selected host real-address entry are read out in processing a request made by one of the virtual computers for address conversion, the flag in the validity field is examined to determine whether or not the contents of the selected host real-address entry are valid. If the contents of selected host real-address entry are found invalid, a cause of a program interrupt indicating an addressing exception is reported to the virtual computer making the request. If the contents of the selected host real-address entry are found valid, on the other hand, the requested address conversion is carried out and an address resulting from the address conversion is used as a valid real address in the real storage device. When a request to make a change to the contents of one of the host real-address entries selected by the request from the address reconfiguration array is made by one of the virtual computers, validity information and the high-order part of the start address of a storage segment issued to the address reconfiguration array along with the request are used to replace present values of the validity and host real-address fields of the selected hose real-address entry respectively.

It should be noted that, if only validity information is issued to the address reconfiguration array in a request made by one of the virtual computers to make a change to the contents of one of the host real-address entries selected by the request from the address reconfiguration array, only the validity field of the selected host real-address entry is updated. If only the high-order part of the start address of a storage segment is issued to the address reconfiguration array in a request made by one of the virtual computers to make a change to the contents of one of the host real-address entries selected by the request from the address reconfiguration array, on the other hand, only the host real-address field of the selected host real-address entry is updated.

According to the present invention, a host real-address entry is selected from the address reconfiguration array after a virtual computer is activated. The high-order part of the start address of a storage segment is then read out from the selected host real-address entry and merged with the remaining low-order portion of a logical address specified by the activated virtual computer, allowing a real address in the storage segment of the real storage device to be created in an address-generation process. In an update process, on the other hand, an address specified by the activated virtual computer can then be written into the selected host real-address entry, replacing previous contents of the host real-address entry: the high-order part of the start address of a storage segment.

As described above, a host real-address entry comprises two fields, i.e. a validity field and a host real-address field. In a process of generating a real address in a storage segment of the real storage device, the real address is generated only if a flag stored in the validity field denotes that the contents of a selected host real-address entry are valid. If the flag stored in the validity field indicates that the contents of the selected host real-address entry are invalid, on the other hand, a cause of a program interrupt indicating an addressing exception is reported to a virtual computer requesting the generation of the real address. In a process of making a change to the contents of the address reconfiguration array, a host real-address entry is selected from the address reconfiguration array, and pieces of information stored in both the validity and host real-address fields of the selected host real-address entry or either one of the fields are updated in accordance with an instruction issued by a virtual computer making a modification request.

In this way, control of the reconfiguration of storage areas, which remarkably enhances the utilization efficiency of the real storage device, can be implemented at a low cost.

DESCRIPTION OF THE PREFERRED EMBODIMENTS

The present invention will become apparent from the following detailed description of preferred embodiments of a technique for allocating memory areas of a storage device adopted in a system for controlling the reconfiguration of the memory areas with reference to accompanying diagrams.

Figure 4:
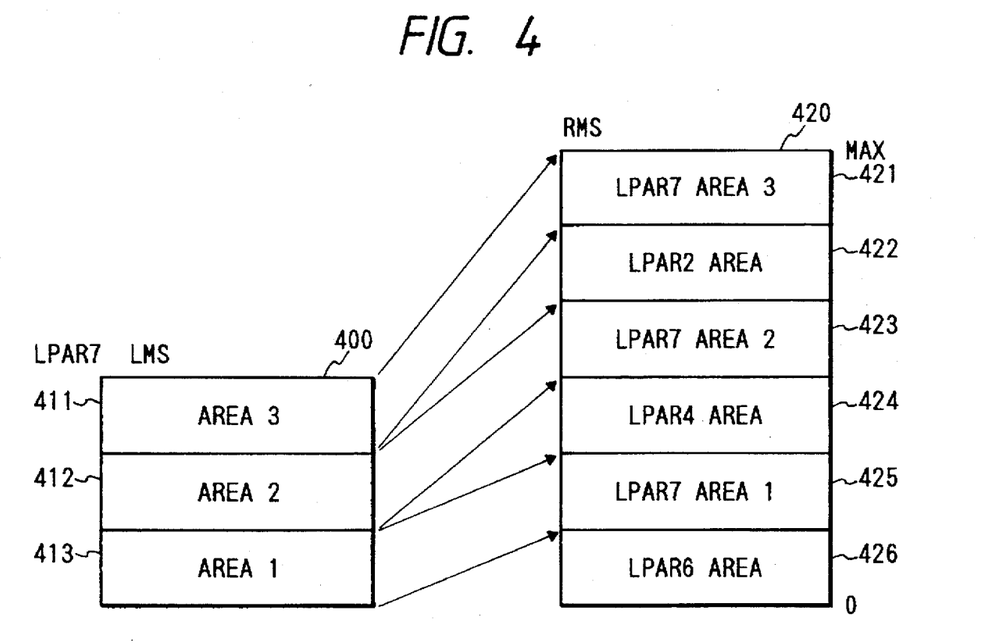
FIG. 4 is a diagram showing typical allocation of noncontiguous unused storage segments of a real storage device to contiguous logical storage segments of a virtual computer wherein more than one noncontiguous unused storage-area segments are allocated to the contiguous logical memory of the virtual computer.

FIG. 4 is a diagram showing an activated virtual machine LPAR7 specifying a required storage capacity η to which the RMS' three noncontiguous unused storage segments 5, 3 and 1 shown in FIG. 3(b) are to be typically allocated. The three noncontiguous unused storage segments are shown in FIG. 4 as LPAR7 areas 1 to 3 respectively.

As shown in FIG. 3(b), the unused storage segment 5 starts at storage address α and ends at storage address α+β−1 whereas the unused storage segment 3 starts at storage address α+β+γ and ends at storage address α+β+γ+δ−1. As for the unused storage segment, the start and end storage addresses are α+β+γ+δ+ε and α+β+γ+δ+ε+ζ−1 respectively. Accordingly, the sizes of the unused storage segments 5, 3 and 1 are β, δ and ζ respectively.

Let the storage capacity η required by the LPAR7 be equal to the sum of β, δ and ζ in this example. In this case, an LMS 400 pertaining to the LPAR7 requiring the contiguous storage capacity η is divided into three logical storage areas LMS1, LMS2 and LMS3 denoted by reference numerals 413, 412 and 411 respectively in FIG. 4 so that the LMS1, LMS2 and LMS3 logical storage areas 413, 412 and 411 have a capacity β, δ and ζ respectively. The storage capacities β, δ and ζ are deliberately made the same as the sizes of the LPAR7 areas 1 to 3 of the RMS denoted by reference numerals 425, 423 and 421, allowing the LPAR7 areas 425, 423 and 421 to be allocated to the LMS1, LMS2 and LMS3 to form well-fitting memory mapping. In other words, the LMS 400 of the LPAR7 requiring the contiguous storage capacity η is divided into the logical areas 413, 412 and 411 which are exactly mapped to the noncontiguous storage segments 425, 423 and 421 respectively.

At the time the LPAR7 specifying the required storage capacity η is activated, only part of the storage capacity η is used. In some cases, part of the storage capacity η is put in an off-line state some time after the activation. In this case, the storage capacity ζ or the storage capacities δ and ζ, for example, are treated as if their values were zero. It should be noted that a storage capacity with a value of zero implies that its associated storage segment in the RMS is unallocated.

Figure 5:
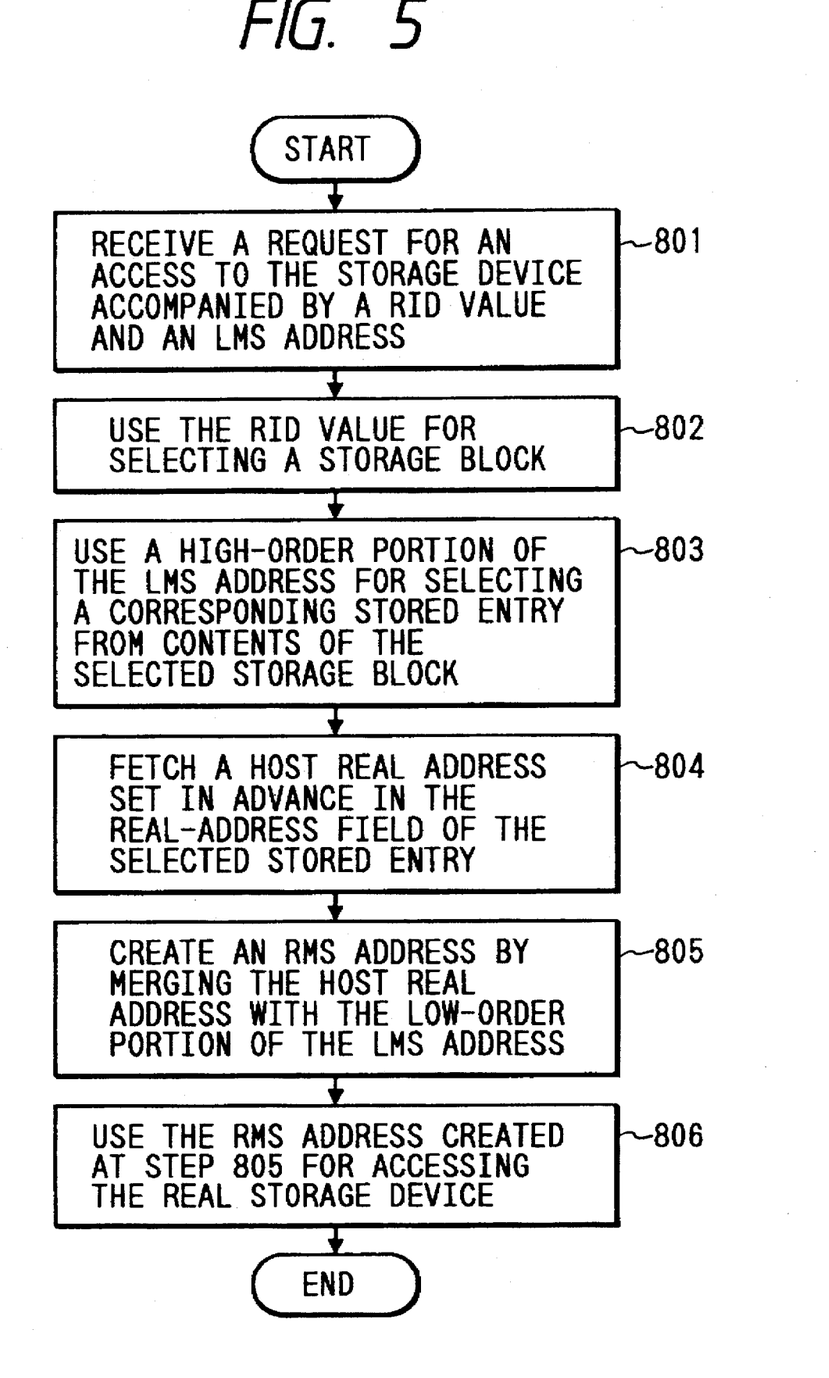
FIG. 5 is a flow chart briefly showing a procedure for converting a memory access to a logical storage area of a contiguous LMS into a memory access to a real storage segment of a noncontiguous RMS adopted by an embodiment of the present invention.

FIG. 5 is a flowchart of a procedure for converting a memory access to a logical storage area in the contiguous LMS into a memory access to one of noncontiguous storage segments in the RMS for a case in which the contiguous LMS is divided into logical storage areas mapped to noncontiguous storage segments of the RMS.

First of all, at a step 801 of the flowchart, an LIP makes a request to access its contiguous LMS, issuing an RID (Region ID) indicating the identification of the LPAR employing the LIP and a logical address at which the LMS is to be accessed. When this request is made, the contiguous LMS of the LPAR has already been divided into logical storage areas mapped to three noncontiguous storage segments in the RMS. The start addresses of the three storage segments in the RMS and logical addresses in the LMS mapped to the start addresses have been stored in hardware logic circuits in advance.

At a step 802, the RID is used to select a storage block indicated by the RID. The storage block comprises a plurality of host real-address entries each having a host real-address field for storing a start address in the RMS to which the logical address received at the step 801 is mapped.

At a step 803, a high-order portion of the logical address received from the LIP is used to select a host real-address entry from the storage block selected at the step 802.

At a step 804, a high-order portion of an RMS address corresponding to the a high-order portion of the logical address specified at the step 801 is fetched from the host real-address field of the host real-address entry selected at the step 803.

At a step 805, the high-order portion of the RMS address corresponding to the high-order portion of the logical address obtained at the step 804 is merged with the remaining low-order portion of the logical address to produce a real address.

At a step 806, the RMS is accessed at the real address produced at the step 805.

The above description has briefly explained the procedure for converting a memory access to a logical storage area in the contiguous LMS into a memory access to one of noncontiguous storage segments in the RMS.

Figure 6A:
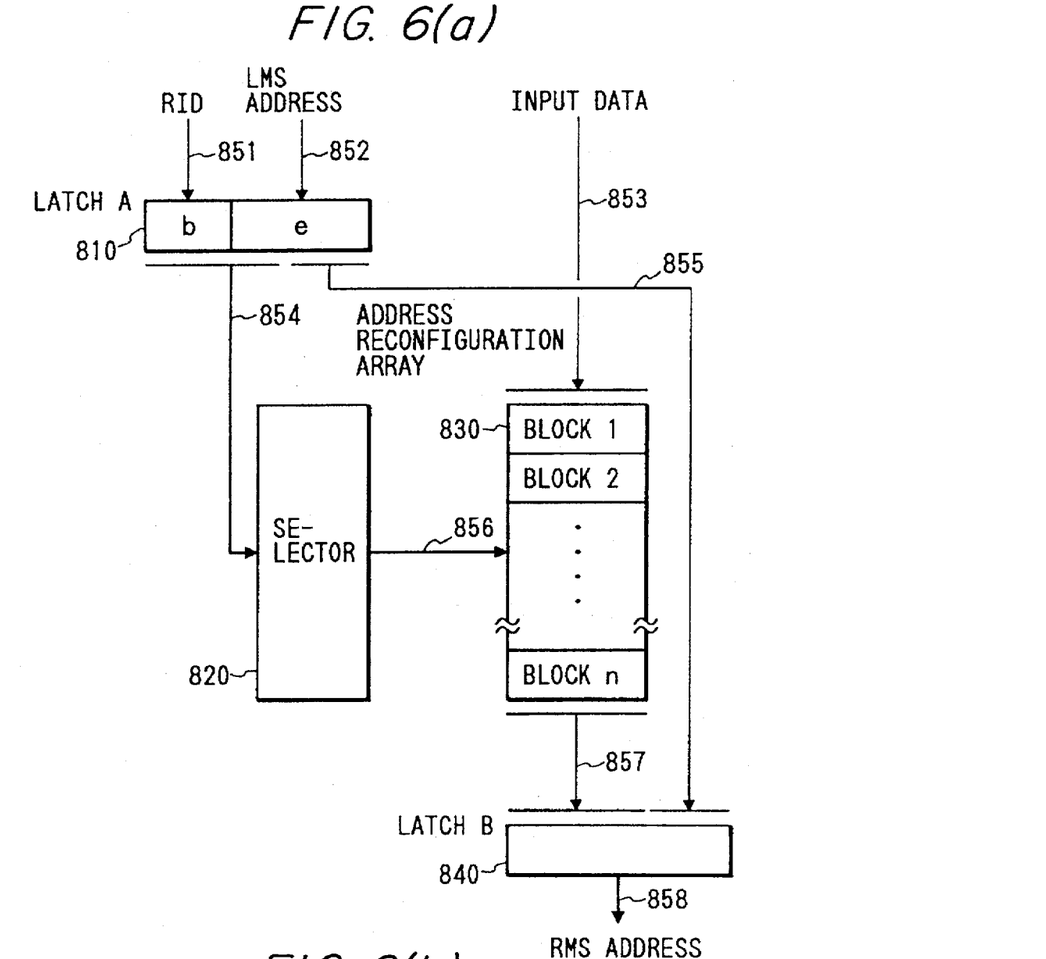
FIG. 6(a) is a logic block diagram showing a hardware configuration of an embodiment provided by the present invention.
Figure 6B:
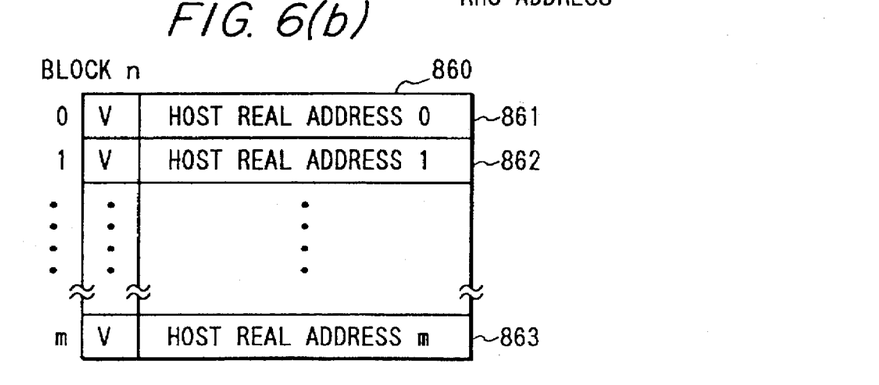
FIG. 6(b) is a diagram showing a detailed configuration of one of storage blocks composing an address reconfiguration array.
Figure 7:
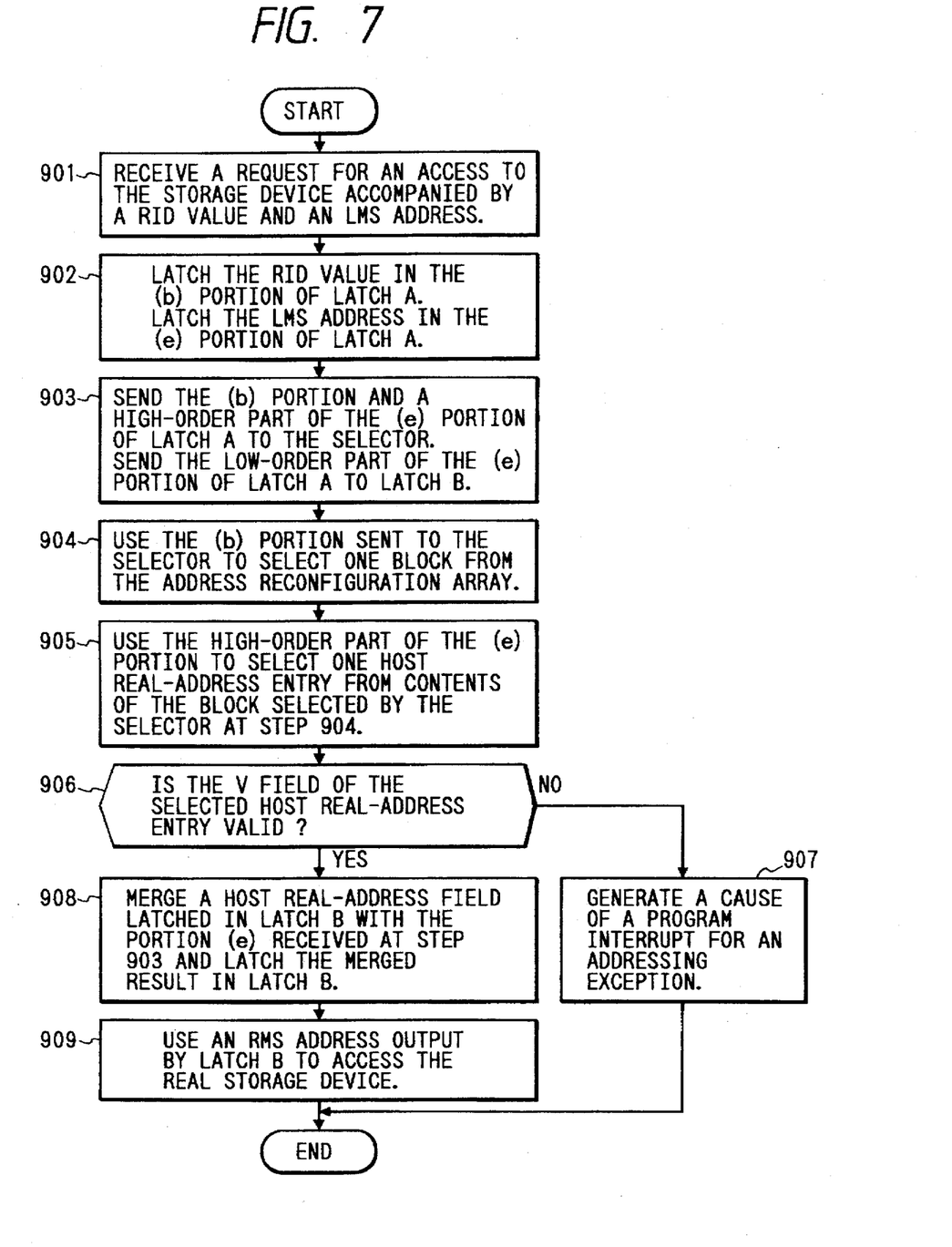
FIG. 7 is a flow chart showing in detail the procedure for converting a memory access to a logical storage area of a contiguous LMS into a memory access to one of noncontiguous storage segments of the RMS adopted by the embodiment of the present invention.

Next, a detailed embodiment provided by the present invention for implementing the above conversion process is described by referring to FIGS. 6(a) and (b) as well as FIG. 7.

FIG. 7 is a flowchart showing in detail the procedure for converting a memory access to a logical storage area of a contiguous LMS into a memory access to one of noncontiguous storage segments of an RMS adopted by the embodiment. FIG. 6(a) is a logic block diagram showing a hardware configuration of the embodiment for implementing the conversion procedure shown in FIG. 7 whereas FIG. 6(b) is a diagram showing a detailed configuration of one of storage blocks composing an address reconfiguration array.

As shown in FIG. 6(a), an RID representing contiguous logical storage areas in the LMS is input through a signal line 851 which is connected to a latch A denoted by reference numeral 810. In addition, a logical storage address in the contiguous LMS is input through a signal line 852 which is also connected to the latch A 810 as well.

Having its inputs connected to the signal lines 851 and 852, the latch A 810 serves as a relay register for temporarily storing the RID representing the contiguous logical storage areas in the LMS received through the signal line 851 and the logical storage address in the contiguous LMS received through the signal line 852. The latch A 810 is connected to a selector 820 and a latch B 840 by signal lines 854 and 855 respectively.

The selector 820 receives the RID representing the contiguous logical storage areas in the LMS and a high-order portion of the logical storage address in the contiguous LMS output by the latch A 810 through the signal line 854. The selector 820 is used for selecting one among a plurality of storage blocks (block 1 to block n) composing an address reconfiguration array 830.

The selector 820 is also connected to the address reconfiguration array 830 by a signal line 856. As described above, the address reconfiguration array 830 includes a plurality of storage blocks. One of the storage blocks is selected by a block select command signal transmitted through the signal line 856. The contents of a host real-address entry in the selected storage block are transmitted to the latch B 840 through a signal line 857.

Data is written into a host real-address entry in a storage block selected from the address reconfiguration array 830 through a signal line 853 also connected to the address reconfiguration array 830.

Having its inputs connected to the signal lines 857 and 855, the latch B 840 serves as a relay register for temporarily storing the contents of a host real-address entry in a selected one among the storage blocks composing the address reconfiguration array 830 and the remaining low-order portion of a logical address in the contiguous LMS transmitted through the signal lines 857 and 855 respectively. The latch B 840 outputs an RMS address in the real storage device through a signal line 858.

The above description explains a detail hardware-logic configuration of an embodiment implementing a procedure for converting a memory access to a logical storage area of a contiguous LMS into a memory access to one of noncontiguous real storage segments of the RMS.

Next, details of a logic configuration of the address reconfiguration array 830 are explained by referring to FIGS. 6(a) and (b).

As shown in FIG. 6(a), the address reconfiguration array 830 comprises a plurality of storage blocks. One of the storage blocks composing the address reconfiguration array 830 is selected in accordance with a block select command signal transmitted through the signal line 856.

As shown in FIG. 6(b), any selected storage block 860 further comprises a plurality of host real-address entries, entry 0, entry 1 to entry m denoted by reference numerals 861, 862 to 863 respectively. One of the host real-address entries 861 to 863 (entry 0 to entry m) composing a selected storage block is selected in accordance with an entry select command signal also received through the signal line 856. Each of the host real-address entries 861 to 863 comprises two fields. One of the field is a V (validity) field containing a flag for indicating whether or not the contents of host real-address entry are valid. The other one is a host real-address field for storing the start address of a storage segment in the RMS.

If the flag in the V field indicates that the host real-address entry is valid, the contents of its host real-address field are output to the B latch 840 through the signal line 857. If the flag in the V field indicates that the contents of host real-address entry are invalid, on the other hand, a signal is output to indicate that a cause of a program interrupt for an addressing exception exists.

In this example, a host real-address entry of a storage block 860 of the address reconfiguration array 830 represents 1M (mega) bytes of memory and a storage block 860 accommodates 2,064 host real-address entries. In other words, a storage block 860 can be used to handle addresses of up to 2 G (giga) bytes of memory. In this case, the two G (giga) bytes are the capacity of the RMS.

As described above, data can be written into a host-real address entry of a selected storage block 860 in the address reconfiguration array 830 through the signal line 853 connected thereto. Such data can be stored in any arbitrary host real-address entry in one among a plurality of storage blocks 860 composing the address reconfiguration array 830.

The above description explains a detailed embodiment of an address reconfiguration array serving as a principal part of hardware used to implement a procedure for converting a memory access to a logical storage area of a contiguous LMS into a memory access to one of noncontiguous storage segments of the RMS.

Next, details of the address-conversion process are described by referring to FIGS. 6(a) and (b) as well as FIG. 7.

As shown in FIG. 7, the procedure for converting a memory access to a logical storage area of a continuous LMS into a memory access to one of noncontiguous storage segments of the RMS comprises steps 901 to 909. A conversion processing procedure for each step is explained as follows.

First of all, at the step 901, an LIP makes a request to access its contiguous LMS, issuing a predetermined RID (Region ID) assigned to an LPAR in operation which the LIP pertains to. In addition to the predetermined RID, the LIP also specifies a logical address, at which the LMS is to be accessed. The predetermined RID and the logical address are temporarily stored in the A latch 810 through the signal lines 851 and 852 respectively.

When this request is made, the contiguous LMS of the LPAR has already been divided into logical storage areas mapped to noncontiguous storage segments in the RMS. Host real-address entries of a storage block in the address reconfiguration array 830 which is assigned to the LPAR have each already been filled with information on the mapping of a logical storage area in the contiguous LMS of the LPAR to one of noncontiguous storage segments in the RMS.

At the step 902, the predetermined RID received through the signal line 851 is latched in the (b) portion of the A latch 810 whereas the logical address received through the signal line 852 is latched in the (e) portion of the A latch 810.

Having its inputs connected to the signal lines 851 and 852, the A latch 810 serves as a relay register for temporarily storing the predetermined RID received through the signal line 851 and the logical address in the contiguous LMS received through the signal line 852.

At the step 903, the predetermined RID latched in the (b) portion of the A latch 810 and a high-order part of the logical address latched in the (e) portion of the A latch 810 are transmitted to the selector 820 through the signal line 854. At the same time, the remaining low-order part of the logical address latched in the (e) portion of the A latch 810 is supplied to the B latch 840 through the signal line 855.

At the step 904, the selector 820 forwards the predetermined RID, which has been received through the signal line 854 at the step 903, to the address reconfiguration array 830 through the signal line 856, requesting the address reconfiguration array 830 to select one of a plurality of storage blocks composing the address reconfiguration array 830. Receiving the predetermined RID through the signal line 856, the address reconfiguration array 830 selects a storage block accordingly.

At the step 905, the selector 820 forwards the high-order part of the logical address, which has also been received through the signal line 854 at the step 903, to the address reconfiguration array 830 through the signal line 856, requesting the address reconfiguration array 830 to select one of a plurality of host real-address entries composing the storage block selected at the step 904. Receiving the high-order part of the logical address through the signal line 856, the address reconfiguration array 830 selects a host real-address entry accordingly. The address reconfiguration array 830 then transmits the contents of the selected host real-address entry to the B latch 840 through the signal line 857.

At the step 906, the B latch 840 receives through the signal line 857 the contents of the host real-address entry selected at the step 905 from a plurality of host real-address entries composing the storage block selected at the step 904 from a plurality of storage blocks constituting the address reconfiguration array 830 and latches them therein. The B latch 840 then examines the flag in the V field of the host real-address entry to see whether or not the contents of the host real-address entry are valid. If the host real-address entry is found valid, the flow of processing continues to the step 908. If the host real-address entry is found invalid, on the other hand, the flow of processing continues to the step 907.

At the step 907, a cause of a program interrupt signaling an addressing exception is generated. In this case, the operation to access the real storage device is suspended. As described above, the processing at this step is executed only if the flag in the V field of the host real-address entry indicates that the contents of the host real-address entry are invalid. The 'invalid' value of the flag in the V field of the host real-address entry implies that either no storage segment of the RMS is allocated to the logical storage area of the LMS being accessed or the storage segment of RMS is in an off-line state.

At the step 908, the contents of the host real-address entry selected at the step 905 from a plurality of host real-address entries composing the storage block selected at the step 904 from a plurality of storage blocks composing the address reconfiguration array 830, which have been transmitted through the signal line 857, are latched in a high-order portion of the B latch 840. In addition, the remaining low-order part of the logical address in a storage area of the contiguous LMS, which has been transmitted through the signal line 855, is latched in the remaining low-order portion of the B latch 840. As described above, the processing at this step is executed only if the flag in the V field of the host real-address entry indicates that the contents of the host real-address entry are valid.

That is to say, at this step, the contents of the host real-address field in a host real-address entry are treated as a high-order part of an RMS address whereas the remaining low-order part of the logical address in a storage area of the contiguous LMS, which has been transmitted through the signal line 855, is used as the remaining low-order part of the RMS address. By merging both the high and low-order parts with each other, a complete RMS address can be created. This RMS address is an address in the real storage device at which the RMS is to be actually accessed.

At the step 909, a request is made to access the RMS (real storage device) at the real storage (RMS) address created at the step 908.

The above description explains details of an embodiment for implementing the procedure for converting a memory access to a logical storage area of a contiguous LMS into a memory access to one of noncontiguous storage segments of the RMS.

Next, an embodiment implementing a procedure for changing at run time the contents of a host real-address entry in one of a plurality of storage blocks composing the address reconfiguration array 830 is described by referring FIGS. 6(a) and (b).

When an LIP makes a request to make a change at run time to the contents of a host real-address entry in one of a plurality of storage blocks composing the address reconfiguration array 830, its RID and a logical address in a storage area of the contiguous LMS are specified in the request. The RID and the logical address are received through the signal lines 851 and 852 respectively. The RID received through the line 851 is latched in the (b) portion of the A latch 810 whereas the logical address received through the signal line 852 is latched in the (e) portion of the A latch 810.

Latching the RID and the logical address received through the signal lines 851 and 852 respectively, the A latch 810 transmits the RID latched in the (b) portion thereof and a high-order part of the logical address latched in its (e) portion to the selector 820 through the signal line 854.

The selector 820 in turn forwards the RID in the (b) portion, which has been received through the signal line 854, to the address reconfiguration array 830 through the signal line 856, requesting the address reconfiguration array 830 to select one of a plurality of storage blocks composing the address reconfiguration array 830.

Receiving the RID through the signal line 856, the address reconfiguration array 830 selects a storage block accordingly.

As for the (e) portion, the selector 820 forwards the high-order part of the logical address, which has also been received through the signal line 854, to the address reconfiguration array 830 through the signal line 856, requesting the address reconfiguration array 830 to select one of a plurality of host real-address entries composing the selected storage block.

Receiving the high-order part of the logical address through the signal line 856, the address reconfiguration array 830 selects a host real-address entry accordingly. Update-data received by the address reconfiguration array 830 through the signal line 853 is then written into the selected host real-address entry.

By carrying out at run time the operation to write update-data into a series of host real-address entries such as the one described above, RMS addresses corresponding to logical addresses in storage areas of any contiguous LMS owning an RID can be changed arbitrarily at run time. On top of that, by changing the flag in the V field of a host real-address entry from a 'valid' value to an 'invalid' one, the logical storage area assigned to the host real-address entry can be disconnected at run time from the LMS. By changing the flag in the V field of a host real-address entry from an 'invalid' value to a 'valid' one, on the contrary, the logical storage area assigned to the host real-address entry can be connected at run time to the LMS.

As described above, according to the present invention, if a contiguous unused storage segment, which has a size equal to or larger than the storage capacity required by an LPAR, does not exist in the RMS for allocation to the LPAR upon the activation thereof, start addresses of noncontiguous unused storage segments existing in the RMS are set in a plurality of host real-address entries composing a storage block in the address reconfiguration array 830 allocated to the LPAR, allowing the logical storage areas in the LMS of the LPAR to be mapped to the noncontiguous unused storage segments. The contents of the host real-address entries composing a storage block in the address reconfiguration array 830 are used in an address-conversion process, allowing a logical address in a storage area of the contiguous LMS specified by the LPAR into a real address in one of the noncontiguous storage segments of the RMS. That is to say, the present invention provides a means for allocating any unused storage segments of the real storage area of the RMS, even if the unused storage elements are noncontiguous, to logical storage areas of an LMS as though the unused storage segments were contiguous.

After the RMS is allocated to an LPAR, an OS operating on the LPAR may disconnect or connect storage areas of its LMS by using an off-line or on-line command. In order to do it, the V fields of a plurality of host real-address entries stored in the hardware are changed at run time from a 'valid' value to an 'invalid' one or vice versa. In this way, the mapping and the sizes of a plurality of allocated storage segments in the RMS can be changed at run time. That is to say, when an OS operating on the LPAR disconnects a storage area of its LMS by using an off-line command once a storage segment of the RMS has been allocated to that storage area, the storage segment of the RMS allocated to the disconnected storage area of the LMS can be reconfigured at run time from a used state to an available (or unused) one.

When the V field of a host real-address entry stored in memory in the hardware is changed at run time from a 'valid' value to an 'invalid' one or vice versa, a real address stored in the host real-address field of the same host real-address entry can also be updated as well. The mapping of an LMS address to an RMS address can thus be changed at run time too.

As a result, the operatability of the system is enhanced. On top of that, a method of controlling the reconfiguration of storage segments of a real storage device, which increases the utilization efficiency of the storage device, can be implemented.

In this embodiment, a method of controlling the reconfiguration of storage segments of a real storage device implemented by hardware logic is adopted. It should be noted, however, that the configuration of such storage segments can also be controlled by a micro program as well.

While keeping the cost low, what have been discovered in the present invention can be used to implement the conversion of an address in a logical memory of a virtual computer into an address in a real storage device, set as well as modify the mapping of a plurality of storage areas in a logical memory to a plurality of storage segments in a real storage device and validate as well as invalidate the mapping. On top of that, the present invention allows the operatability of the system to be enhanced and, at the same time, the utilization efficiency of the real storage device to be increased as well.

I claim:

1. A method of controlling reconfiguration of a physical storage area of a real storage device included in an information processing apparatus having said real storage device, and a plurality of virtual computers operating on a central processing unit, wherein said physical storage area is logically divided into a plurality of storage segments to be allocated to a plurality of logical memories each employed in one of said virtual computers operating on said central processing unit, and an address reconfiguration array which includes a plurality of storage blocks each being assigned to one of said virtual computers and having its logical memory divided into a plurality of logical storage areas according to a high-order portion of logical addresses thereof, wherein each of said storage blocks is composed of a plurality of host real-address entries each being assigned to one of said logical storage areas and used for storing a high-order part of a start address of one of said storage segments of said physical storage area, said method comprising the steps of:

selecting a storage block from said address reconfiguration array in accordance with an identifier of a virtual computer, said identifier being issued by said virtual computer;

selecting one of said host real-address entries from the selected storage block in accordance with said high-order portion of a logical address specified by said virtual computer which issued said identifier; and generating a real address of said real storage device by reading out said high-order part of a start address of one of said storage segments from the selected host real-address entry, and merging said high-order part of said start address of one of said storage segments with a remaining low-order portion of said logical address to create said real address of said storage segment of said real storage device.

2. A method according to claim 1, wherein each host real-address entry comprises a validity field for storing a flag indicating whether or not contents of said host real-address entry are valid, and a host real-address field for storing said high-order part of a start address of one of said storage segments of said real storage device; and wherein said generating step comprises the steps of:

examining said flag in said validity field to determine whether or not said contents of said selected host real-address entry are valid, reporting, when said contents of the selected host real-address entry are found invalid, a cause of a program interrupt indicating an addressing exception to said virtual computer making said request, and carrying out, when said contents of the selected host real-address entry are found valid, said request for address conversion and using an address resulting from address conversion as a valid real address of said real storage device.

3. A method according to claim 2 wherein said generating step further comprises the steps of:

updating, when only validity information is issued to said address reconfiguration array in said request for address conversion to make a change to contents of one of said host real-address entries selected by said request for address conversion, only said validity field of the selected host real-address entry; and updating, when only said high-order part of a start address of one of said storage segments is issued to said address reconfiguration array in said request for address conversion to make a change to contents of one of said host real-address entries selected by said request for address conversion, only said host real-address field of the selected host real-address entry.

4. An apparatus for controlling reconfiguration of a physical storage area of a real storage device included in an information processing system having said real storage device and a plurality of virtual computers operating on a central processing unit, wherein said physical storage area is logically divided into a plurality of storage segments to be allocated to a plurality of logical memories each employed in one of said virtual computers operating on said central processing unit, said apparatus comprising:

an address reconfiguration array which includes a plurality of storage blocks each being assigned to one of said virtual computers and having its logical memory divided into a plurality of logical storage areas according to a high-order portion of logical addresses thereof, wherein each of said storage blocks is composed of a plurality of host real-address entries each being assigned to one of said logical storage areas and used for storing a high-order part of a start address of one of said storage segments of said physical storage area;

a selector for selecting a storage block from said address reconfiguration array in accordance with an identifier of a virtual computer, said identifier being issued by said virtual computer and selecting one of said host real-address entries from the selected storage block in accordance with a high-order portion of a logical address specified by said virtual computer which issued said identifier; and an address generator for generating a real address of said real storage device by reading out said high-order part of a start address of one of said storage segments from the selected host real-address entry and merging said high-order part of a start address of one of said storage segments with a remaining low-order portion of said logical address to create said real address of said storage segment of said real storage device.

5. An apparatus according to claim 4, further comprising:

modification means for making a change to contents of the selected host real-address entry by replacing previous contents of the selected host real-address entry.

6. An apparatus according to claim 4, wherein each of said host real-address entries comprises:

a validity field for storing a flag indicating whether or not contents of said host real-address entry are valid; and a host real-address field for storing said high-order part of a start address of one of said storage segments.

7. A method according to claim 1, further comprising the step of:

making a change to contents of the selected host real-address entry by replacing previous contents of the selected host real-address entry.

8. A method according to claim 2, further comprising the step of:

making a change to contents of the selected host real-address entry by replacing previous contents of the validity and host real-address fields of the selected host real-address entry.

* * * * *